United States Patent
Worgan et al.

(10) Patent No.: US 6,568,833 B2
(45) Date of Patent: May 27, 2003

(54) LIGHT

(75) Inventors: Michael Christopher Worgan, Ulverston (GB); Timothy George Bushell, Kirby In Furness (GB)

(73) Assignee: Oxley Developments Company Limited, Cumbria (GB)

( * ) Notice: Subject to any disclaimer, the term of this patent is extended or adjusted under 35 U.S.C. 154(b) by 0 days.

(21) Appl. No.: 09/894,869

(22) Filed: Jun. 27, 2001

(65) Prior Publication Data

US 2002/0071275 A1 Jun. 13, 2002

(30) Foreign Application Priority Data

Jun. 28, 2000 (GB) .............................. 00115898

(51) Int. Cl.$^7$ ................................ F21V 7/00
(52) U.S. Cl. ................ 362/247; 362/294; 362/373; 362/545; 362/547; 362/470; 362/471; 362/555; 362/439; 174/16.3; 361/688; 361/704
(58) Field of Search ............... 362/247, 294, 362/373, 545, 547, 470, 471, 555, 800, 439; 174/16.3; 361/688, 704

(56) References Cited

U.S. PATENT DOCUMENTS

| | | | | |
|---|---|---|---|---|
| 5,567,036 A | * | 10/1996 | Theobald et al. | ............ 362/236 |
| 5,857,767 A | * | 1/1999 | Hochstein | ................... 362/294 |
| 6,011,493 A | * | 1/2000 | Bushell et al. | ............... 340/981 |
| 6,180,874 B1 | * | 1/2001 | Brezina et al. | ............ 165/80.3 |
| 6,183,100 B1 | * | 2/2001 | Suckow et al. | ............. 340/471 |
| 6,198,272 B1 | * | 3/2001 | Pool et al. | .................. 324/133 |
| 6,220,722 B1 | * | 4/2001 | Begemann | .................. 362/226 |

* cited by examiner

*Primary Examiner*—Sandra O'Shea
*Assistant Examiner*—Mark Tsidulko
(74) *Attorney, Agent, or Firm*—Christie, Parker & Hale, LLP

(57) ABSTRACT

A light is disclosed which may be an aircraft light, comprising a base 2 for mounting the light, a chassis 8 upstanding from the base, a circuit board 10 mounted upon an outer face of the chassis and at least one solid state emitter—and more preferably an aray of LEDs 24, 26—mounted upon the circuit board. The invention provides a light which is constructionally convenient but can provide a clean beam pattern.

5 Claims, 2 Drawing Sheets

LIGHT

The present invention is concerned with solid state lights.

Conventional incandescent lights are being increasingly replaced by solid state lights, notably light emitting diodes (LEDs) which have substantially increased reliability and lower maintenance costs. This has traditionally been at the expense of brightness and colours restricted to red, green and yellow but the latest technologies now enable LEDs to compete in many more applications where incandescent light bulbs with coloured filters are conventionally used.

Nonetheless using LEDs to replace incandescent bulbs involves careful optical design, not least because the light emitted from the solid state chip is directional and to enable it to leave the chip (inside which it is generated) without reflection at the chip's inside surface, the chip has to be covered with a transparent high refractive index plastic that is preferably in the form of a lens and which is thermally compatible with the chip, wire bonds and the connecting leads.

Careful design of this nature has allowed LEDs to be used in applications such as automobile rear lights, traffic lights and most electronic instrumentation.

In these applications the light is emitted in a relatively narrow beam and thus brightness requirements can be satisfied with conventional LEDs mounted by conventional means.

In avionic lighting the polar pattern of the light is dictated by authorities such as the Civil Aviation Authority (UK) or the Federal Aviation Authority (US). The polar light pattern is important for navigation and formation lights because these are intended to indicate to neighbouring aircraft the relative position of the aircraft to each other to facilitate flying at night. Navigation and formation lights are provided on wing tips, air intakes and other distinctive parts of the aircraft.

Night flying is further facilitated by the use of night vision goggles (NVG) which amplify the low levels of infra red in the night scene and present the resulting image to the pilot. Advantageously aviation external lighting should be virtually free from infra red so that the goggles of a neighbouring pilot are not blinded which would prevent the much lower intensity infrared light from the night scene being visible and thus endanger the aircraft. This type of lighting is called NVG Friendly.

This can be achieved with conventional incandescent bulbs by the use of optical filters (see for example the applicant's own U.S. Pat. No. 6,011,493.

Because of the nature of light generation in LEDs, the light output has a relatively sharp spectrum and in particular, unlike the "black body" radiation (in accordance with Wien's Law) from a hot incandescent filament, LEDs can be selected which emit very little infra red radiation which makes them particularly suitable for NVG Friendly aircraft external lighting. Provided the polar light pattern can be achieved and the correct colour and brightness, the reduced maintenance and improved reliability of LEDs offer significant benefits for their use on the outside of aircraft.

In covert military operations it is required to turn off the visible lights and to operate with only infra red emitters (of relatively low intensity) at the aircraft exterior to enable NVG equipped pilots to "see" neighbouring aircraft. To achieve this, infra red emitting LEDs can be incorporated relatively simply with the visible LEDs because they use similar power requirements and are physically similar. Again it is important that the polar light pattern of the infra red LEDs is specially designed, the requirement being to signify the relative spatial positions of the aircraft with respect to each other but not to observers with NVG on the ground. Typically therefore infra red polar light patterns are such as to minimise infra red emissions below the plane in which the aircraft is flying (so called "below the water line"). Thus both the polar light patterns of the LEDs (in accordance with CAA/FAA regulations) and the IR LEDs (for covert operations) are important and in general terms are different and they need to be optimised by careful design of the LED assembly and its mounting, noting also that the LEDs and IR LEDs generally have different transparent lens covers (their primary encapsulation).

Another problem to address in solid state light design is that of dissipating the heat from high brightness (and hence high power) solid state emitters.

Existing solid state lights have typically been modelled on filament bulb designs, having tubular bodies (as required for a standard bayonet fitting) with circuitry and a PCB bearing the LEDs mounted within die body.

In accordance with the present invention, there is a light comprising a base for mounting the light, a chassis upstanding from the base, a circuit board mounted upon an outer face of the chassis and at least one solid state emitter mounted upon the circuit board.

The arrangement can be constructionally simple while meeting the requirements for heat dissipation and polar light pattern.

Preferably the chassis comprises a heat sink. The heat sink may be integrally formed with the chassis. It is particularly preferred that the circuit board is mounted on a front face of the chassis and the heat sink projects from the rear of the chassis.

Still more preferably, the heat sink comprises a set of fins projecting from the rear of the chassis The light preferably comprises a reflector or baffle adjacent the solid state light emitter(s). This is advantageous in ensuring that the required polar light pattern is achieved. The reflector or baffle preferably has a surface which is adjacent the solid state light emitter(s) and forms an angle, most preferably an acute or right angle, with the portion of the circuit board bearing the emitter(s).

It is particularly advantageous that the reflector or baffle is mounted on the circuit board. To this end the reflector may be elbowed to provide a reflector/baffle portion and a portion for mounting to the circuit board.

The base is preferably provided with means for connection to the electrical supply.

In one preferred embodiment, the base is formed as a bayonet fitting. Hence this embodiment can substitute for a bayonet fitting incandescent bulb.

In a further preferred embodiment, the base has a base surface upon which the light rests in use. In such an embodiment the base may be adapted to be bolted in position. This may be by provision of holes for receipt of a pair of terminal posts, through which the light is connectable to an electrical supply.

By allowing the potentially unreliable bayonet fitting (originally designed for easy replacement of the less reliable and vibration sensitive incandescent bulbs) to be dispensed with, this arrangement allows reliability to be improved.

It is especially preferred that the circuit board is inclined to a mounting axis of the base. This again can assist in providing a required polar light pattern.

The mounting axis is the axis of the bayonet fitting body (in embodiments having this fitting) or is perpendicular to the base surface of the light (in embodiments having this feature).

It is especially preferred that the circuit board is removably mounted upon the chassis. To this end the chassis and circuit board may be provided with respective contacts arranged to form a circuit for electrical supply upon mounting of the circuit board to the chassis. The contacts may comprise a male contact on one of the circuit board and the chassis and a socket for receiving the male contact on the other of the circuit board and the chassis.

The chassis may be provided with means defining a channel for receipt of an edge of the circuit board. One edge at least of the board can thereby be coupled to the chassis in a manner allowing rapid de-coupling.

Specific embodiments of the present invention will now be described by way of example only, with reference to the accompanying drawings, in which.

Both illustrated lights are for mounting inside an aircraft exterior lamp assembly. Both can be used instead of incandescent bulbs.

Figure 1:
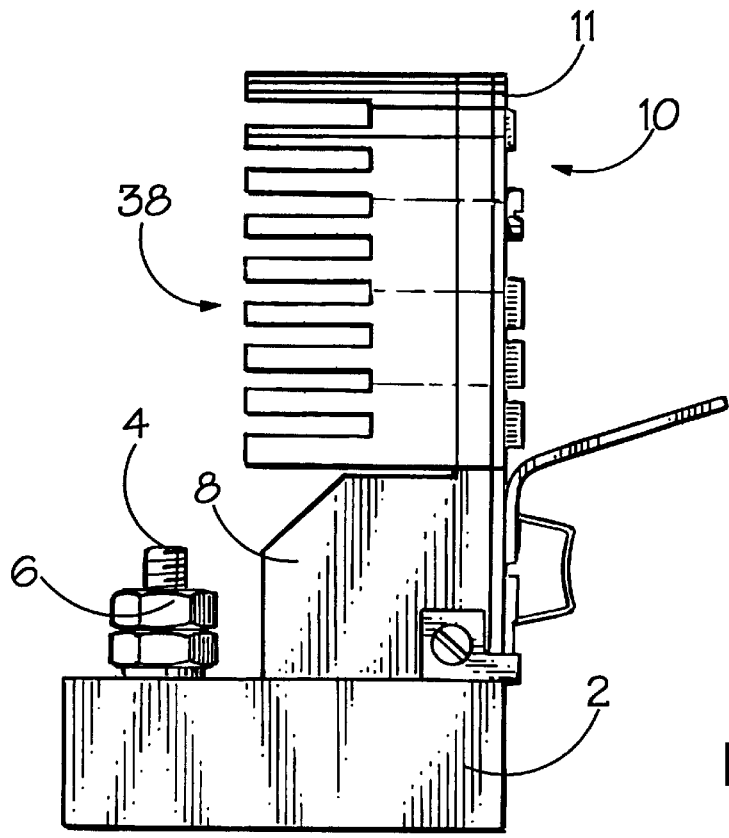
FIGS. 1 and 2 are respectively side and front elevations of a first aircraft light embodying the present invention.
Figure 2:
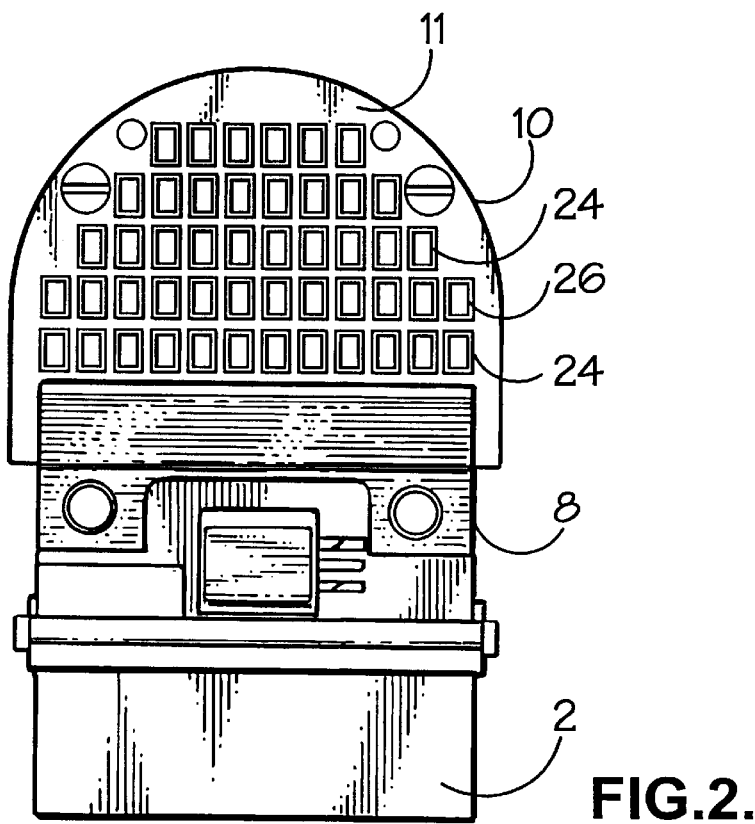
Figure 3:
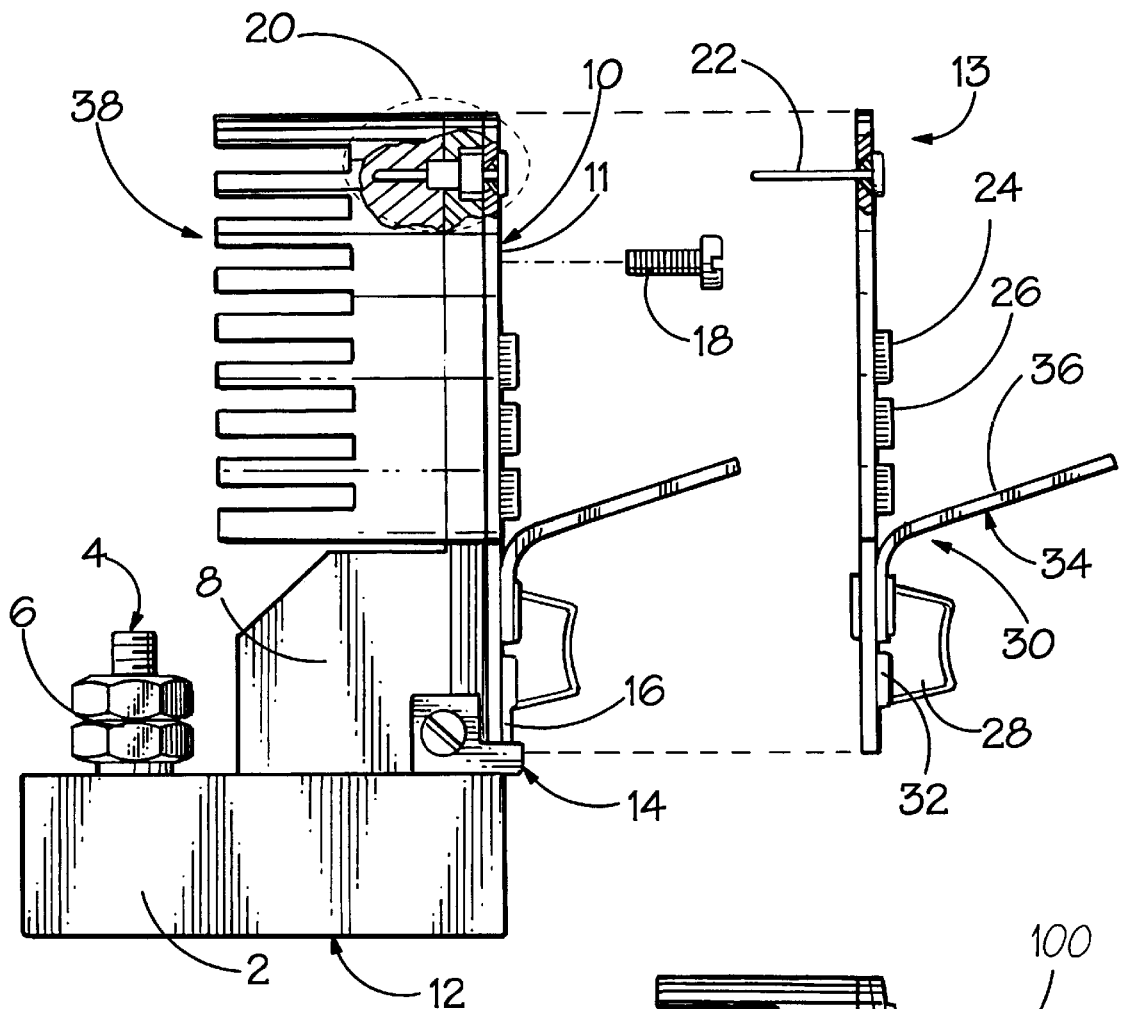
FIG. 3 is a side elevation corresponding to FIG. 1 but to a larger scale.

The embodiment illustrated in FIGS. 1 to 3 has a base in the form of a mounting block 2. Electrical power supply is via a pair of threaded terminal posts (one of which is seen at 4) bearing nuts 6. The mounting block 2 is typically bolted to an aircraft borne lamp assembly allowing heat to be conducted away through the lamp assembly to the aircraft.

Upon the mounting block 2 is a chassis 8 serving to mount a printed circuit board (PCB) assembly 10. The PCB assembly 10, comprising a PCB 11, is mounted upon a front face of the chassis which in the FIGS. 1 to 3 embodiment is perpendicular to a base surface 12 of the mounting block. However in alternative embodiments the chassis front face, and hence the PCB assembly, are backwardly inclined (ie. the lower end of the PCB is further forward than the upper end) in order to provide a required polar light pattern.

Running along a lower edge of the chassis 8 is a retaining clip 14 having an upwardly projecting lip 16 forming a channel for receiving the lower edge of the PCB 11. The PCB's upper region is secured to the chassis by fixing screws 18.

In this way the PCB assembly 10 is removably mounted upon the chassis.

FIG. 1 shows the PCB assembly both in place and, at 13, removed from the chassis.

Electrical connections are formed from the two terminal posts 4, along the chassis 8 to respective chassis mounted electrical socket arrangements, one of which is seen at 20. These are positioned to receive PCB mounted electrical contact pins, one of which is seen at 22, projecting from the PCB's rear face. The pins/sockets can be high reliability items designed for occasional use to military standards. The pins 22 are connected by PCB tracks to LEDs 24, 26.

In FIG. 2 it can be seen that the front face of PCB 11 bears an array of LEDs. In the preset exemplary embodiment these include infra red LEDs 26 as well as visible light LEDs 24. In other embodiments one type or the other only may be present. The infra red and visible LEDs 26, 24 are separately connected allowing switching between the two and can be connected in series or in parallel or a combination depending on factors including the voltage available in the aircraft (eg. 28 V.D.C. or 115 V AC at 400 Hz). A suitable arrangement can provide the ability to simply check whether one LED has failed, where this is in a series chain making visible to the eye what could otherwise by masked by other LEDs in the array.

Regulation of current to the LEDs, and switching between visible and infra red sources, can be achieved by PCB mounted circuitry. In the illustrated embodiment, block 28 contains a microprocessor for both of these functions.

Secured to the front face of the PCB 11 is a reflector 30. In the illustrated exemplary embodiment this takes the form of an elbowed plate, a first part 32 thereof resting upon and being coupled to the PCB 11 and a second, reflector part 34 projecting from the PCB and providing the required reflective surface 36, which in the illustrated exemplary embodiment forms an acute angle with the portion of the PCB 11 bearing the LEDs 24, 26.

The orientation of the PCB 11, the form of the reflector 30 and the positioning and properties of the LEDs themselves all contribute in providing the required polar light pattern.

A heat sink 38 is provided at the rear of the chassis 8. In the illustrated example the heat sink takes the form of a set of fins integrally formed with the chassis 8 and projecting rearwardly therefrom. The PCB 11 has a thermally conductive PC board to provide a route for heat conduction from the LEDs.

Figure 4:
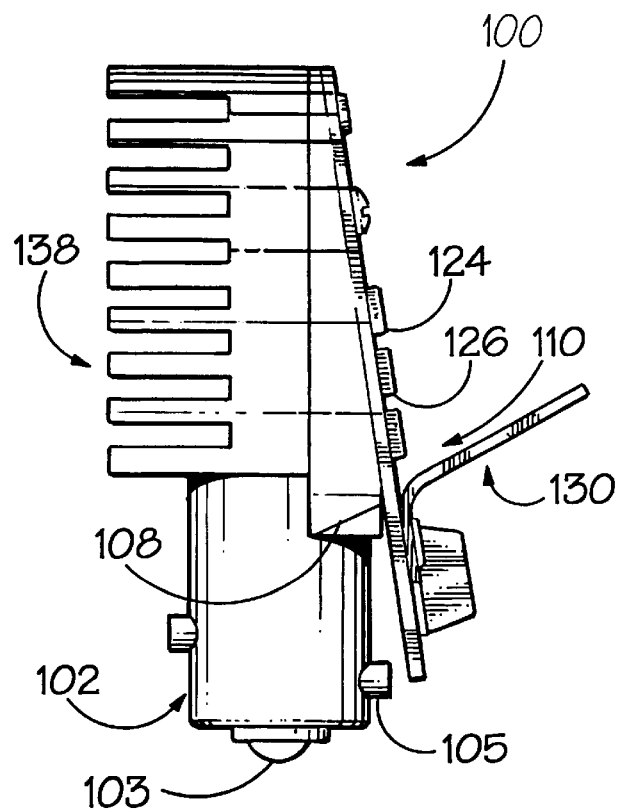
FIG. 4 is a side elevation of a second aircraft light embodying the present invention.

Whereas FIGS. 1 to 3 concern a light which is bolted into place, FIG. 4 illustrates a light 100 having a base in the form of a bayonet fitting 102 with a lowermost contact 103 and a pair of locating lugs 105 which serve also as contacts. The fitting is to be received in a standard light socket allowing the light 100 to be substituted for an existing incandescent bulb without replacement or removal of the socket.

The light comprises a PCB assembly 110 similarly formed to that of the first described embodiment and again having LEDs 124, 126 adjacent a reflector 130.

In the FIG. 4 embodiment the PCB assembly 110 is inclined with respect to the axis of the bayonet fitting, in order to provide a required polar light pattern.

The PCB assembly 110 is mounted upon a chassis 108 comprising an integrally formed, rearwardly projecting heat sink 138.

The mounting of the PCB does not utilise a clip as in the FIGS. 1 to 3 embodiment.

What is claimed is:

1. A light comprising:
    a base for mounting the light;
    a chassis upstanding from the base;
    a circuit board mounted upon an outer face of the chassis, wherein the circuit board is removably mounted upon the chassis;
    and at least one solid state emitter mounted upon the circuit board; and
    a male contact on one of the circuit board and the chassis and a socket for receiving the male contact on the other of the circuit board and the chassis.

2. A light comprising a base for mounting the light, a chassis upstanding from the base, a circuit board mounted upon an outer face of the chassis and at least one solid state emitter mounted upon the circuit board, wherein the chassis is provided with means defining a channel for receipt of an edge of the circuit board.

3. A light as claimed in claim 2, which is an aircraft light.

4. A light as claimed in claim 2, which is NVG friendly.

5. A light as claimed in claim 2, wherein an IR and a visible solid state emitters are mounted upon the circuit board and the IR and the visible solid state emitters are separately connected allowing switching between the two.

* * * * *